United States Patent [19]
Benck et al.

[11] Patent Number: 5,138,523
[45] Date of Patent: Aug. 11, 1992

[54] DIGITIZER TABLET HAVING COOLING APPARATUS WITH BASE AND INTEGRATED HEAT SINK

[75] Inventors: Jeffrey W. Benck, Delray Beach; Mohanlal S. Mansuria, Coral Springs; Robert D. Wysong, Boca Raton, all of Fla.

[73] Assignee: International Business Machines Corporation, Armonk, N.Y.

[21] Appl. No.: 779,447

[22] Filed: Oct. 18, 1991

[51] Int. Cl.⁵ .............................................. H05K 7/20
[52] U.S. Cl. .................................... 361/386; 361/392; 361/399; 361/388
[58] Field of Search .............. 165/80.3, 185; 235/1 D; 361/380, 386, 388–389, 392, 394, 395, 399; 364/708; 455/347–351

[56] References Cited

U.S. PATENT DOCUMENTS

| | | | |
|---|---|---|---|
| 4,029,999 | 6/1977 | Neumann et al. | 361/386 |
| 4,571,456 | 2/1986 | Paulsen et al. | 179/2 C |
| 4,602,314 | 7/1986 | Broadbent | 361/386 |

OTHER PUBLICATIONS

"Thermally Conductive Elastomer for Cooling", IBM TDB, vol. 28, No. 4, Sep. 1985, p. 1490.

Primary Examiner—Gregory D. Thompson
Attorney, Agent, or Firm—G. E. Grosser

[57] ABSTRACT

A digitizer tablet has a base integrated with a heat sink. The base includes a flat portion which surrounds the heat sink. The sink is recessed relative to the flat portion and includes a flat upper surface on which a thermal pad is mounted. A planar member overlies the base and has a plurality of heat generating modules mounted on the underside thereof, the modules being pressed into the thermal pad to establish a thermal conduction whereby heat flows from the modules through the thermal pad and into the heat sink. The underside of the heat sink is recessed and has a plurality of cooling pins which provide a relatively large area. The pins are cooled by natural air convection and radiation, and lie within the recess to prevent body contact with portions other than the tips thereof. Bosses mount the planar member on the base and coact with fasteners to press the modules against the thermal pad.

9 Claims, 4 Drawing Sheets

DIGITIZER TABLET HAVING COOLING APPARATUS WITH BASE AND INTEGRATED HEAT SINK

FIELD OF THE INVENTION

This invention relates to the field of data processing apparatus, and, more particularly, to a digitizer tablet having improved cooling apparatus including a base provided with an integrated heat sink.

BACKGROUND OF THE INVENTION

A digitizer tablet has been designed as an I/O device for inputting information into a data processing system. The tablet comprises a transflective LCD (liquid crystal display) and a magnetic digitizer capturing a user's handwriting input. A planar member supports a microprocessor module and a set of support chip modules such as used in the IBM Model L40 laptop computer. The microprocessor provides the necessary processing power required to execute complicated pen-based operating systems and required functions. The tablet provides versatile I/O options with serial, parallel, floppy scsi, keyboard, and cellular transceiver connectors all residing on the planar. The planar member also has a connector that supports either 4 Mb or 8 Mb DRAM cards to serve as the system memory. Furthermore, the system features a 9600 baud DSP modem and a 20 Mb solid state hardfile with removable "smart" cards.

All of this function adds up to a significant amount of power being dissipated within the housing. Power conversion is handled through copper Kells card technology. The tablet in worst case conditions can dissipate as much as 14 watts within its covers. Customer requirements for small size, low weight, long battery life, and a quiet tablet ruled out the use of a DC controlled fan to provide cooling. An innovative approach had to be used to remove the heat from the internal components such that the independent chips would meet their reliability requirements. This approach required that the "hot" or high powered components conduct their heat out through the base.

The closest prior art known to us includes various examples of cooling apparatus. IBM Technical Disclosure Bulletin, Vol. 28, No. 4, September 1985, page 1490, discloses a THERMALLY CONDUCTIVE ELASTOMER FOR COOLING in which a printed circuit board with components thereon is placed on top of a thermally conductive elastomeric putty which, in turn, is placed on top of a flat base having cooling fins depending from the lower surface thereof. The putty appears to extend substantially completely across the bottom of the planar member and the base.

U.S. Pat. No. 4,571,456—D. C. Paulsen et al discloses a PORTABLE COMPUTER having a plurality of heat generating modules mounted on the bottom surface of a planar member. The modules are mounted so as to provide a small air gap across which heat is transferred into the base. The base acts as a heat sink for dissipating the heat but the base has no special shape facilitating heat dissipation.

U.S. Pat. No. 4,602,314—Broadbent, discloses a HEAT CONDUCTION MECHANISM FOR SEMICONDUCTOR DEVICES. A heat sink is spaced above a semiconductor device and a resilient, deformable body having a thermally conductive outer layer is placed between the device and the heat sink. Heat is conducted by such layer around the deformable body from the device to the heat sink. The devices are arranged in rows and the body and outer is formed in a strip and extends along a row of devices.

U.S. Pat. No. 4,029,999—Newmann et al discloses a THERMALLY CONDUCTING ELASTOMERIC DEVICE that includes an elastomeric pad provided with molded indentations conforming to all the components on a printed circuit board. The pad conducts heat from such components to a heat sink placed above the pad.

However, such prior art may not be useful for a digitizer tablet. A digitizer tablet is intended to be handled by a user in a manner similar to how a writing pad or tablet is used, whereby the tablet can be placed on a desk or a table or on the user's lap. The tablet may be hand held or cradled in one of the user's arms while the free hand "writes" on the tablet. Since there are many different ways the user might come in contact with the tablet during use, a design requirement, in addition to that of being able to effectively dissipate power and heat energy, is that the tablet be constructed to preclude the user from contacting any hot spot which could burn the user or produce user discomfort. In the prior art discussed above, this problem is not discussed, acknowledged or dealt with.

SUMMARY OF THE INVENTION

One of the objects of the invention is to provide a digitizer tablet with improved cooling apparatus which effectively dissipates heat while preventing user contact with hot spots.

Another object of the invention is to provide a digitizer with an integrated base and heat sink, the heat sink having a plurality of cooling pins for increasing the area of cooling surface, which pins are located in a recessed heat sink with substantially only the tips of the pins being engageable with a user.

A further object of the invention is to provide a digitizer tablet in which a microprocessor module and support chip modules are surface mounted on the underside of a planar member and are located relatively close to each other so that any heat generated by such modules is transmitted by a thermal pad into a heat sink integrated into the base of the digitizer.

Briefly, in accordance with the invention, a digitizer tablet has a base integrated with a heat sink. The base includes a flat portion which surrounds the heat sink. The sink is recessed relative to the flat portion and includes a fat upper surface on which a thermal pad is mounted. A planar member overlies the base and has a plurality of heat generating modules mounted on the underside thereof, the modules being pressed into the thermal pad to establish a thermal conduction whereby heat flows from the modules through the thermal pad and into the heat sink. The underside of the heat sink is recessed and has a plurality of pins and provide a relatively large area. The pins are cooled by radiation and natural air convection, and lie within the recess to prevent user body contact with portions other than the tips thereof.

DRAWINGS

Other objects and advantages of the invention will be apparent from the following description taken in connection with the accompanying drawings wherein.

DETAILED DESCRIPTION

Figure 1:
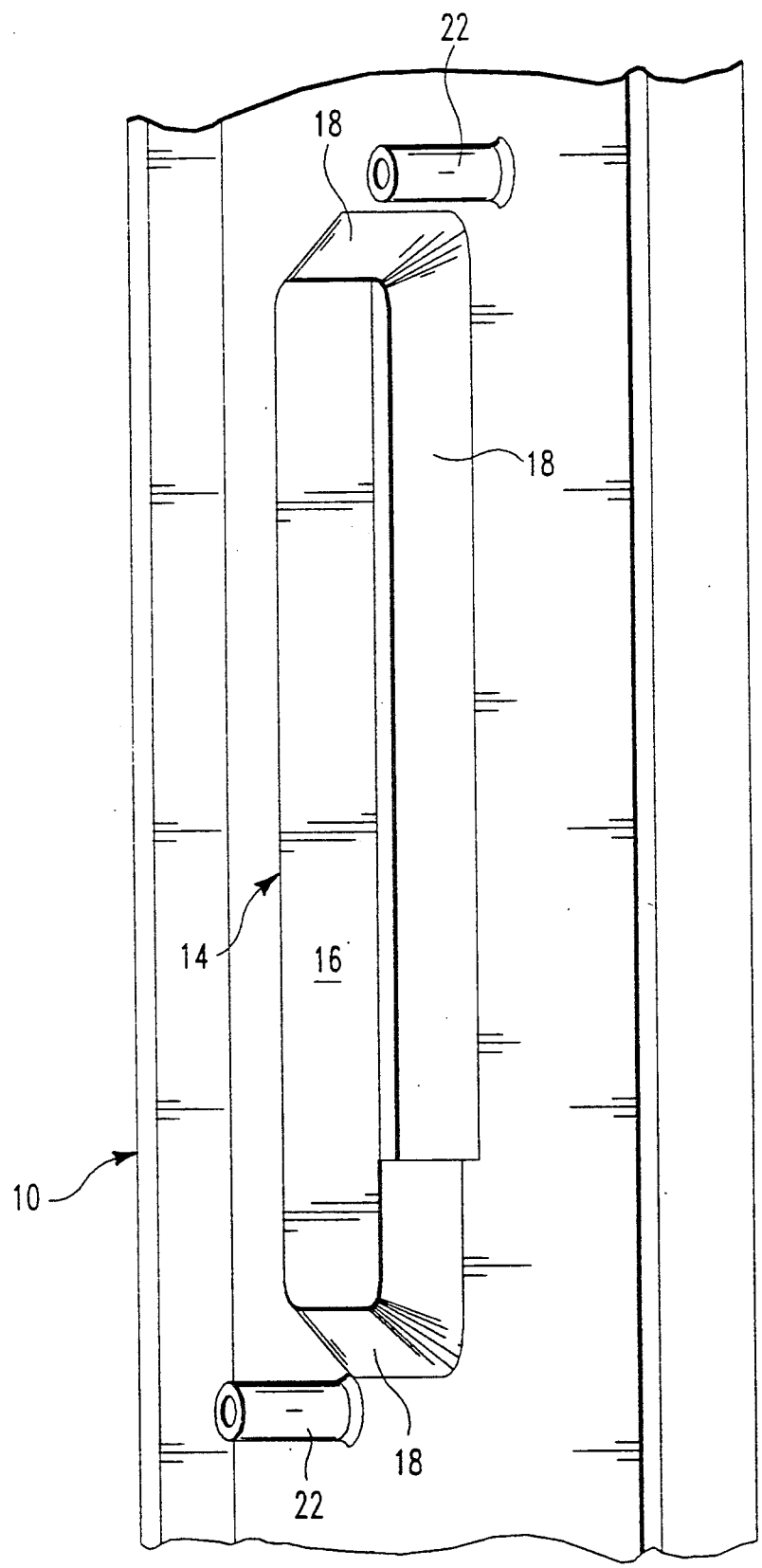
FIG. 1 is a perspective view of a portion of the top of the interior of a digitizer tablet base having an integrated heat sink.

Referring now to the drawings, and first to FIG. 1, a digitizer tablet base 10 is preferably made of cast magnesium which is lightweight and a highly thermally conductive. The choice of magnesium for the base reflects the intent to conduct the thermal energy through the base without compromising on the goal of a lightweight design. It is to be appreciated that a base normally coacts with many different devices and components mounted therein which have been omitted from the drawings for simplicity of illustration of the invention. Base 10 includes a flat, upwardly facing, bottom interior surface 12. Integrated in base 10 is a heat sink 14 having a flat, upwardly facing surface 16 of generally rectangular shape. The plane of surface 16 is above the plane of surface 12 and sloping side walls 18 extend between the two surfaces. The side walls may have a notch 20 therein to provide clearance around an adjacent component or portion (not shown). Two internally threaded mounting bosses 22 are located adjacent opposite corners of heat sink 14 and extend upwardly from the base for mounting a planar thereon in the manner discussed hereafter.

Figure 2:
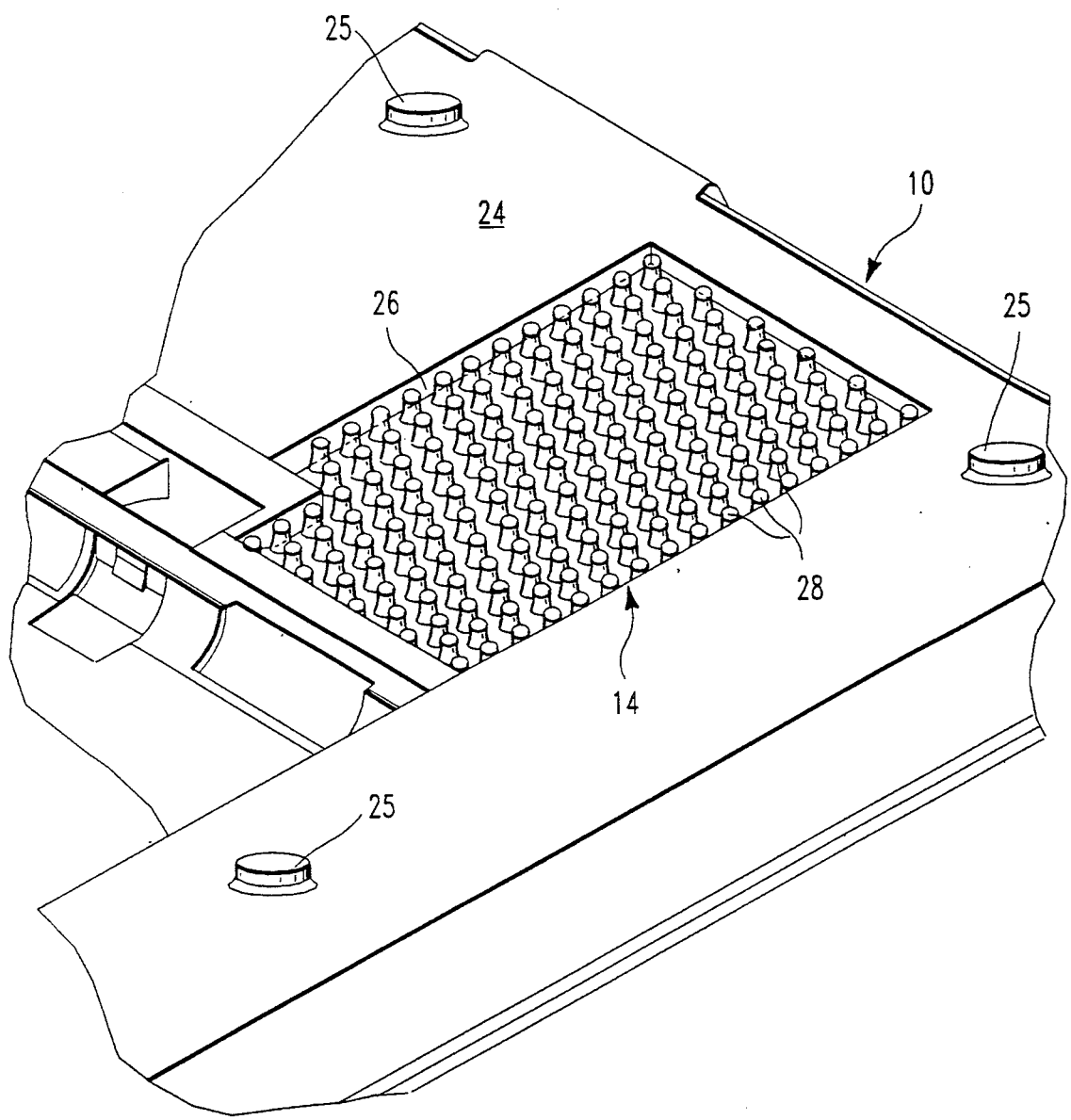
FIG. 2 is a view similar to FIG. 1 but showing the bottom of the base and heat sink.

Referring to FIG. 2, base 10 has a flat bottom surface 24 surrounding a heat sink well 26 in which are located a multiplicity of heat dissipating or cooling pins 28. Well 26 has a flat bottom and sloping side walls extending between surface 24 and the well bottom, the side walls being curved at their intersections with surface 24 and the bottom of the well to facilitate laminar air flow through the well. The pins are parallel and spaced equidistantly from each other and have a cylindrical shape extending from the pin base to its end. The outer edges or corners are rounded to avoid sharp edges that could otherwise cut or irritate a user. The pins are located on 7 mm centers to be spaced sufficiently close together to prevent a user from sticking a finger therein and contacting hot spots at the bases of the pins and the well bottom. When the digitizer base is placed in a position of use with surface 24 facing downwardly, the well forms a relative shallow, inverted saucer shape with the various pins pointing downwardly. The primary function of the pins is to increase the surface area of the heat sink to more effectively cool by transmitting heat into the surrounding air by natural convection and radiation. Furthermore, the ends of pins 28 lie flush with surface 24 and do not project outwardly relative thereto. The pins have lengths corresponding to the depth of well 26. During operation, a temperature gradient develops along the pins with the bases being hot and the ends sufficiently cool so as to cause no discomfort to a user's touch. A plurality of feet 25 extend away from base 10 and provide a standoff space. When the base is placed on a flat surface such as a desk, feet 25 provide a space between the base and the desk allowing air to flow between the base and the heat sink.

Figure 3:
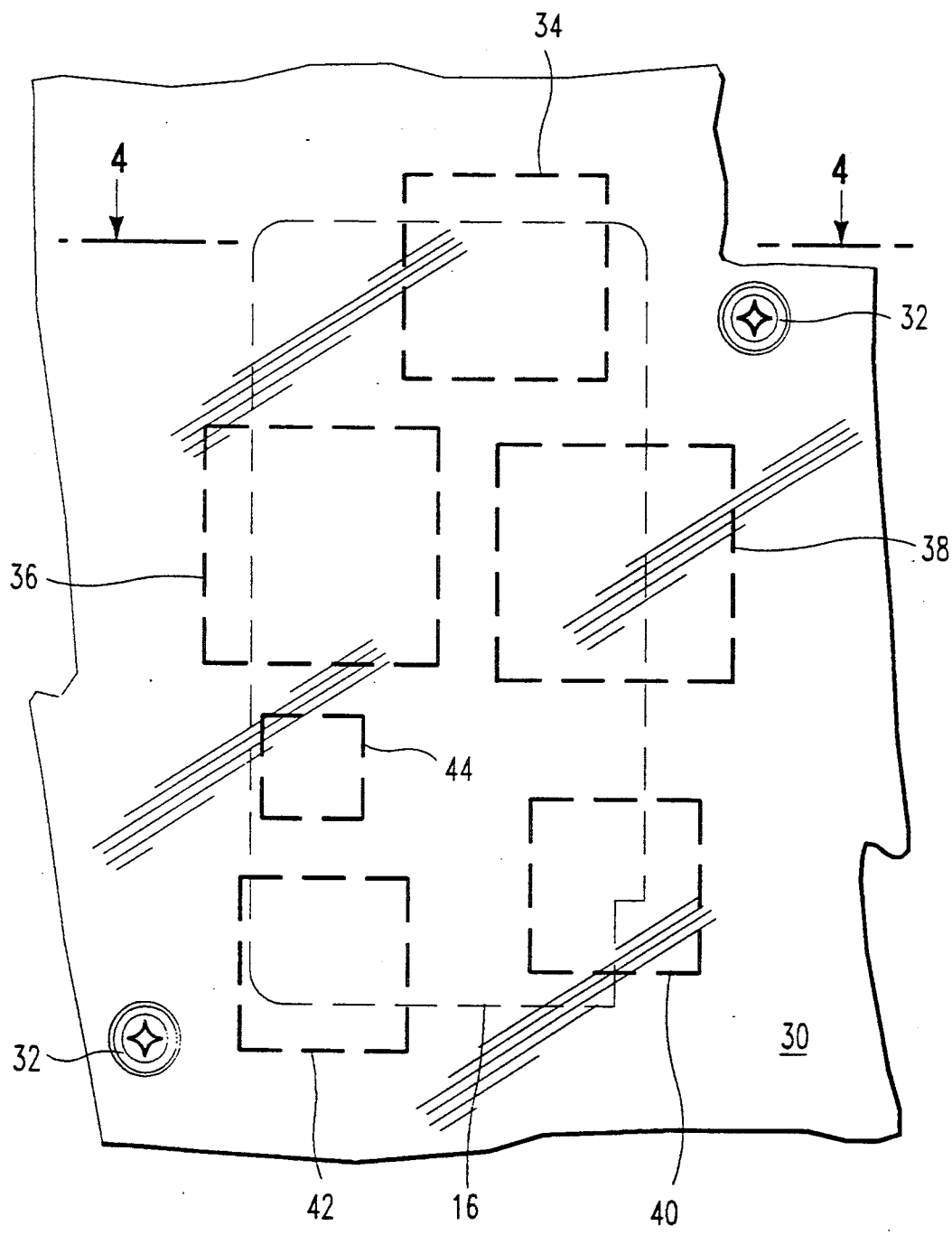
FIG. 3 is a top plan view of a planar member mounted in the base, with parts removed, to illustrate the locations of heat producing modules relative to the heat sink and base.

Referring to FIG. 3, a planar member 30 is mounted on bosses 22 and secured thereto by torq screws 32. A plurality of heat generating, data processing modules 34-40 are mounted on the underside of planar member 30 and are located over heat sink 14. The modules are constructed with surface mounting technology (SMT) and by design have been located on the planar member so as to be relatively close to each other whereby they modules can all be effectively cooled by a relatively small underlying heat sink. Such location of the hot modules into a central area on the planar member allows heat conduction to occur to critical modules such as a microprocessor module. The modules are commercially available and may be, e.g., an Intel 386 SX microprocessor 34. The support chip modules may be a WD 76C1OLP-LR 36, a WD90C20-LR 38, a WD76C21-LV 40, a WD76C30-LU 42, and a SG-615PT 44. During the course of operation, these modules are the primary sources of heat generation which must be effectively cooled.

Figure 4:
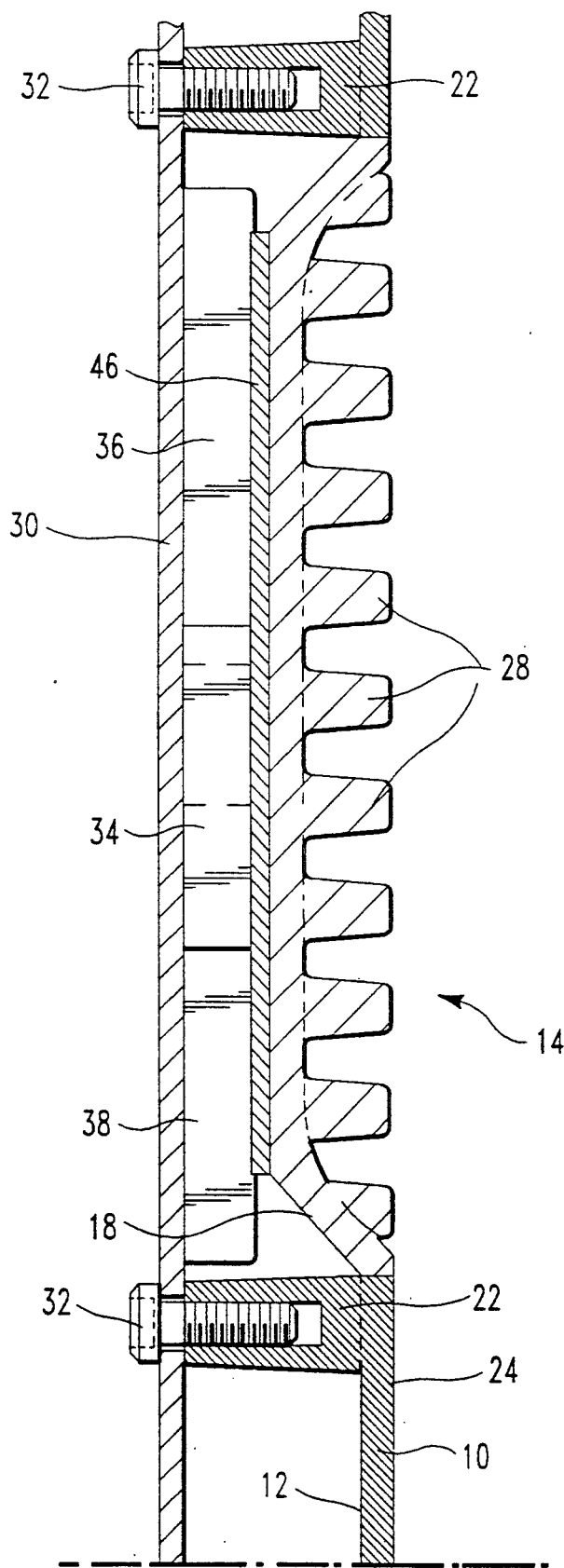
FIG. 4 is an elevation view, enlarged and partly in section, and looking generally along reference lines 4—4 of FIG. 3.

Referring to FIG. 4, an elastomeric thermal pad 46 is interposed between the lower surfaces of the heat generating modules. The pad is a commercially available type of heat pad containing a compressible, compliant spongelike silicone elastomer filled with aluminum oxide particles and laminated on an aluminum foil carrier. The pad has a shape, when view from above, substantially the same as that of surface 16. Also, pad 46 has a substantially uniform thickness when not compressed. The heights of bosses are predetermined so that the planar member 30 rests on top of the bosses, when screws 32 are tightened, and presses the modules into the pad to thereby compress the pad into intimate, effective heat transfer contact therewith. Heat is conducted from the modules 34-40, through pad 46 and into the heat sink 14.

In summary, the main thrust of such design relies on the use of the base to form an attractive external heat sink. This design is unique because the surrounding portions of the base conduct heat generated by low power components while the heat sink area of the base provides more efficient cooling for conducting out greater quantities of heat from higher power components. The base is stepped in or recessed to bring a portion thereof into proximity of the hot components and at the same time created a omni-directional pin heat sink on the outside of the base. A pin heat sink is a more efficient cooling method because of the increased surface area that the pin design provides over a flat plate design.

The internal design of the tablet has been coordinated to take advantage of this cooling ability. The planar in the system is essentially mounted upside down with the large surface mount packages residing on the bottom side of the planar member closest to the base. The high power components are arranged on the planar member to provide heat conducting access to the magnesium base. This was necessary as much of the space inside the tablet is consumed by projecting cards attached to the bottom of the central planar member. The potential air gap between these high power components and the base is filled with a conductive material because air is an ineffective conductor. An aluminum oxide filled silicone, laminated to a thin aluminum carrier, was chosen because of its compliant ability and improved conductivity. The thermal elastomer pad's compliance allowed for slight differences in module heights which the magnesium base by itself could not withstand.

Even though the heat sink area is recessed, a gentle radius is provided around the perimeter of the design to stimulate natural convection cooling off the pins. On the inside, this radius was replaced by a straight angled surface thus increasing the conductive pad surface area for the chips to mount on.

While the tablet is operable in a plurality of positions, the thermal cooling system is more efficient when the user has the unit tilted at a 45 degree angle whether on a table or in hand held use. This efficiency is attributed to a greater amount of natural airflow around the tablet housing and heat sink.

The heat sink design serves several functions beyond providing increased reliability and cooling to the hot commodities inside. It also serves to protect the user from the safety concerns of touching a potentially hot area on the base. The pins are nested closely together to form essentially a "bed of nails" design that is not intended to be visually offensive to the user and at the same time prevent the user from contacting the hotter base area at the bottoms of the pins. A pin heat sink has significantly smaller surface area at the tips of the pins thus minimizing the conductive surface in contact with the user's hands. This characteristic assures that the user will not be harmed by the conduction of the heat through the covers.

It should be apparent to those skilled in the art that many changes can be made in the details and arrangements of steps and parts without departing from the scope of the invention as defined in the appended claims.

What is claimed is:

1. A digitizer tablet comprising:
   a base having a heat sink integrated therein, said base having a flat portion surrounding said heat sink, said flat portion including a flat interior surface and a flat exterior surface;
   said heat sink comprising
      a central portion having a flat, upper heat receiving face spaced from said interior surface, and an exterior heat dissipating surface spaced upwardly of said exterior surface,
      side walls extending between said central portion and said flat portion surrounding said heat sink, and forming with said exterior heat dissipating surface a downwardly opening well,
      and a plurality of heat dissipating pins extending downwardly in said well from said side walls and from said heat dissipating surface, said pins having ends which terminate flush with said flat exterior surface of said base;
   a planar member mounted on said base and having a plurality of heat generating modules mounted thereon with said modules extending downwardly towards said base and said heat sink;
   and a compliant, thermal pad mounted on said heat receiving surface of said heat sink, said thermal pad being in contact with said modules and conforming to said modules so as to allow heat to flow from said modules through said pad and into said heat sink.

2. A digitizer tablet in accordance with claim 1 wherein said pins are evenly spaced from each other by a distance limiting contact by a user with only said ends of said pins.

3. A digitizer tablet in accordance with claim 2 wherein said ends of said pins have rounded edges.

4. A digitizer tablet in accordance with claim 2 wherein said pins are cylindrical and are parallel with each other.

5. A digitizer tablet in accordance with claim 1 wherein said thermal pad has a uniform thickness in an uncompressed condition and covers said heat receiving surface of said heat sink.

6. A digitizer tablet in accordance with claim 5 wherein:
   said modules comprise a microprocessor module and a plurality of microprocessor support chip modules located on said planar member in a centralized area overlying said heat sink, said modules extending downwardly from said planar member but terminating short of said heat receiving surface with said thermal pad lying between ends of said modules and said heat sink.

7. A digitizer tablet in accordance with claim 6 comprising:
   a plurality of bosses extending upwardly, from said base along sides of said heat sink and abutting said planar member to thereby support said planar member on said base, said bosses having heights such that each o modules is supported a distance above said heat receiving surface less than said uniform thickness of said pad.

8. A digitizer tablet in accordance with claim 5 wherein said thermal pad is a silicone elastomer filled with aluminum oxide particles, and has an aluminum foil lamination attached to said heat receiving surface.

9. A digitizer tablet in accordance with claim 7 comprising fastening means attaching said planar member to said bosses and developing forces necessary to compress said thermal pad between said modules and said heat sink.

* * * * *